United States Patent
Jung et al.

(10) Patent No.: US 8,107,434 B2
(45) Date of Patent: Jan. 31, 2012

(54) CONNECTION CONTROL SYSTEM AND METHOD FOR MOBILE COMMUNICATION SYSTEM

(75) Inventors: Jae Dong Jung, Seongnam-si (KR); Seong Kyu Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 1022 days.

(21) Appl. No.: 11/969,470

(22) Filed: Jan. 4, 2008

(65) Prior Publication Data
US 2008/0170547 A1    Jul. 17, 2008

(30) Foreign Application Priority Data
Jan. 12, 2007   (KR) .................. 10-2007-0003663

(51) Int. Cl.
*H04W 4/00* (2009.01)
(52) U.S. Cl. ...................................... 370/331; 455/438
(58) Field of Classification Search .......... 370/328–329, 370/331, 338, 389–390, 392, 432, 235–236; 455/422.1, 423, 432.1, 436, 437, 440, 456.1, 455/456.2
See application file for complete search history.

(56) References Cited

U.S. PATENT DOCUMENTS

| | | | |
|---|---|---|---|
| 7,515,559 B2 * | 4/2009 | Koo et al. .................. | 370/328 |
| 7,633,904 B2 * | 12/2009 | Venkatachalam ............. | 370/331 |
| 7,697,481 B2 * | 4/2010 | Rayzman et al. ............. | 370/331 |
| 7,843,870 B2 * | 11/2010 | Olfat .............................. | 370/328 |
| 7,885,224 B2 * | 2/2011 | Ryu et al. ..................... | 370/328 |
| 7,889,731 B1 * | 2/2011 | Lohtia et al. .................. | 370/389 |
| 7,933,236 B2 * | 4/2011 | Wang et al. ................... | 370/328 |
| 2004/0174845 A1 * | 9/2004 | Koo et al. ...................... | 370/328 |
| 2006/0028986 A1 * | 2/2006 | Kwon et al. ................... | 370/230 |
| 2006/0153132 A1 * | 7/2006 | Saito ............................. | 370/329 |
| 2007/0076684 A1 * | 4/2007 | Lee et al. ....................... | 370/350 |
| 2007/0110016 A1 * | 5/2007 | Shen et al. ..................... | 370/338 |
| 2007/0155378 A1 * | 7/2007 | Lee et al. ....................... | 455/423 |
| 2007/0232339 A1 * | 10/2007 | Ji et al. .......................... | 455/502 |
| 2007/0249347 A1 * | 10/2007 | Saifullah et al. .............. | 455/436 |
| 2007/0258407 A1 * | 11/2007 | Li et al. ......................... | 370/331 |
| 2008/0002610 A1 * | 1/2008 | Zheng et al. .................. | 370/328 |
| 2008/0031182 A1 * | 2/2008 | Maheshwari et al. ......... | 370/320 |
| 2008/0291847 A1 * | 11/2008 | Zheng ........................... | 370/255 |

FOREIGN PATENT DOCUMENTS

| | | |
|---|---|---|
| EP | 1 534 035 | 5/2005 |
| EP | 1 686 729 | 8/2006 |
| WO | WO 2006/011753 | 2/2006 |

* cited by examiner

*Primary Examiner* — Kevin Mew
(74) *Attorney, Agent, or Firm* — The Farrell Law Firm, P.C.

(57) ABSTRACT

A connection control system and method for Wireless Broadband (WiBro) communication system are provided. The connection control method for a mobile communication system, which includes at least one radio access station for providing communication service to a portable subscriber station, and at least one access control router for controlling the radio access station, includes relaying, at a radio access station, an initial ranging request message from the portable subscriber station to an access control router; transmitting, at the access control router received the initial ranging request message, an initial ranging response message to the radio access station and neighbor radio access stations; and relaying, at a radio access station currently synchronized with the portable subscriber station and received the initial ranging response message, the initial ranging response message to the portable subscriber station.

16 Claims, 4 Drawing Sheets

CONNECTION CONTROL SYSTEM AND METHOD FOR MOBILE COMMUNICATION SYSTEM

PRIORITY

This application claims priority under 35 U.S.C. §119(a) to an application entitled "CONNECTION CONTROL SYSTEM AND METHOD FOR MOBILE COMMUNICATION SYSTEM" filed in the Korean Intellectual Property Office on Jan. 12, 2007 and assigned Serial No. 2007-0003663, the contents of which are incorporated herein by reference.

BACKGROUND OF THE INVENTION

1. Field of the Invention

The present invention relates to a wireless broadband (WiBro) communication system and, in particular, to a connection control system and method for WiBro communication system.

2. Description of the Related Art

Wireless Broadband (WiBro) is a wireless broadband Internet technology developed for providing a high-speed data service in stationary environments, pedestrian-speed environments, and mobile environments at speeds below 60 Km/h. The WiBro provides an Internet Protocol (IP)-based asynchronous wireless data transmission service by adopting Orthogonal Frequency Division Multiple Access (OFDMA) for multiple access and Time Division Duplex (TDD) for duplexing.

In order to receive the WiBro service, a mobile terminal must be connected to a WiBro Radio Access Station (RAS).

During a network connection procedure, the mobile terminal selects a cell, synchronizes PHYsical layer (PHY) with an RAS of the selected cell, and receives downlink and uplink parameters through a DownLink Mobile Application Part (DL-MAP) and an UpLink Mobile Application Part (UL-MAP). The mobile terminal then transmits an initial RaNGing REQuest (initial RNG-REQ) message to the RAS and receives an initial RaNGing ReSPonse (initial RNG-RSP) message from the RAS in response to the initial RNG-REQ message. If the initial RNG-RSP message is received, the mobile terminal performs a capability negotiation with the RAS. During the initial ranging procedure, the mobile terminal starts a timer at the same time with the transmission of the initial RNG-REQ message and performs, if the timer expires before receiving the initial RNG-RSP message, the network connection procedure again, i.e. reconnection procedure.

Such a network connection procedure is normally processed in a single cell environment. However, some problems may occur when the mobile terminal is located in an area where at least two cells are overlapped and tries to connect to the network.

For example, when a mobile terminal associated with a serving RAS moves into a handoff area, the mobile terminal may not receive an RNG-RSP message in response to the initial RNG-REQ message, especially when the mobile terminal enters another cell defined by a handoff target RAS. In this case, the mobile terminal must perform the network connection procedure with the target RAS again.

As explained above, since the network connection procedure of the conventional WiBro system requires a redundant network connection procedure, connection delays and user discomfort occur, especially when the mobile terminal attempts an initial ranging in a handoff area.

SUMMARY OF THE INVENTION

The present invention substantially solves the above problems and provides a connection control system and method for a WiBro communication system that are capable of improving connection reliability in a handover region.

The present invention also provides a connection control system and method for a WiBro communication system that are capable of reducing connection delay especially in a handover region.

In accordance with an aspect of the present invention, there is provided a connection control method for a mobile communication system including at least one radio access station for providing communication service to a portable subscriber station, and at least one access control router for controlling the radio access station. The connection control method includes relaying, at a radio access station, an initial ranging request message from the portable subscriber station to an access control router; transmitting, at the access control router that has received the initial ranging request message, an initial ranging response message to the radio access station and neighbor radio access stations; and relaying, at a radio access station that is currently synchronized with the portable subscriber station and that has received the initial ranging response message, relaying the initial ranging response message to the portable subscriber station.

In accordance with another aspect of the present invention, there is provided a connection control method for a mobile communication system including at least one radio access station for providing communication service to a portable subscriber station, and at least one access control router for controlling the radio access station. The connection control method includes transmitting, at the portable subscriber station, an initial ranging request message to a serving radio access station; transmitting, at the serving radio access station, an Hbis initial ranging request message to an access control router in response to the initial ranging request message; transmitting, at the access control router, an Hbis initial ranging response message to the serving radio access station and neighbor radio access stations in response to the Hbis initial ranging request message; and transmitting, at a target access control router among the neighbor radio access stations that have received the Hbis initial ranging response message, an initial ranging response message to the portable subscriber station.

In accordance with another aspect of the present invention, there is provided a connection control system for a mobile communication network including at least one radio access station for providing a communication service to a portable subscriber station, and at least one access control router for controlling the radio access station. In the connection control system the portable subscriber station relays an initial ranging request message from the portable subscriber station to an access control router; the access control router that has received the initial ranging request message transmits an initial ranging response message to the radio access station and neighbor radio access stations; and a radio access station that is currently synchronized with the portable subscriber station and that has received the initial ranging response message relays the initial ranging response message to the portable subscriber station.

In accordance with another aspect of the present invention, there is provided a connection control system for a mobile communication network. The connection control system includes a portable subscriber station which transmits an initial ranging request message and performs a handoff; a serving radio access station which receives the initial ranging request message and transmits an Hbis initial ranging request message; an access control router which receives the Hbis initial ranging request and transmits an Hbis initial ranging response to the serving radio access station and neighbor radio access stations of the serving radio access station; and a target radio access station which receives the Hbis initial ranging response message and transmits an initial ranging response message to the portable subscriber station in response to the Hbis initial ranging response message.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Certain terminologies are used in the following description for convenience and reference only and are not limiting. In the following detailed description, only the exemplary embodiments of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature and not restrictive.

Figure 1:
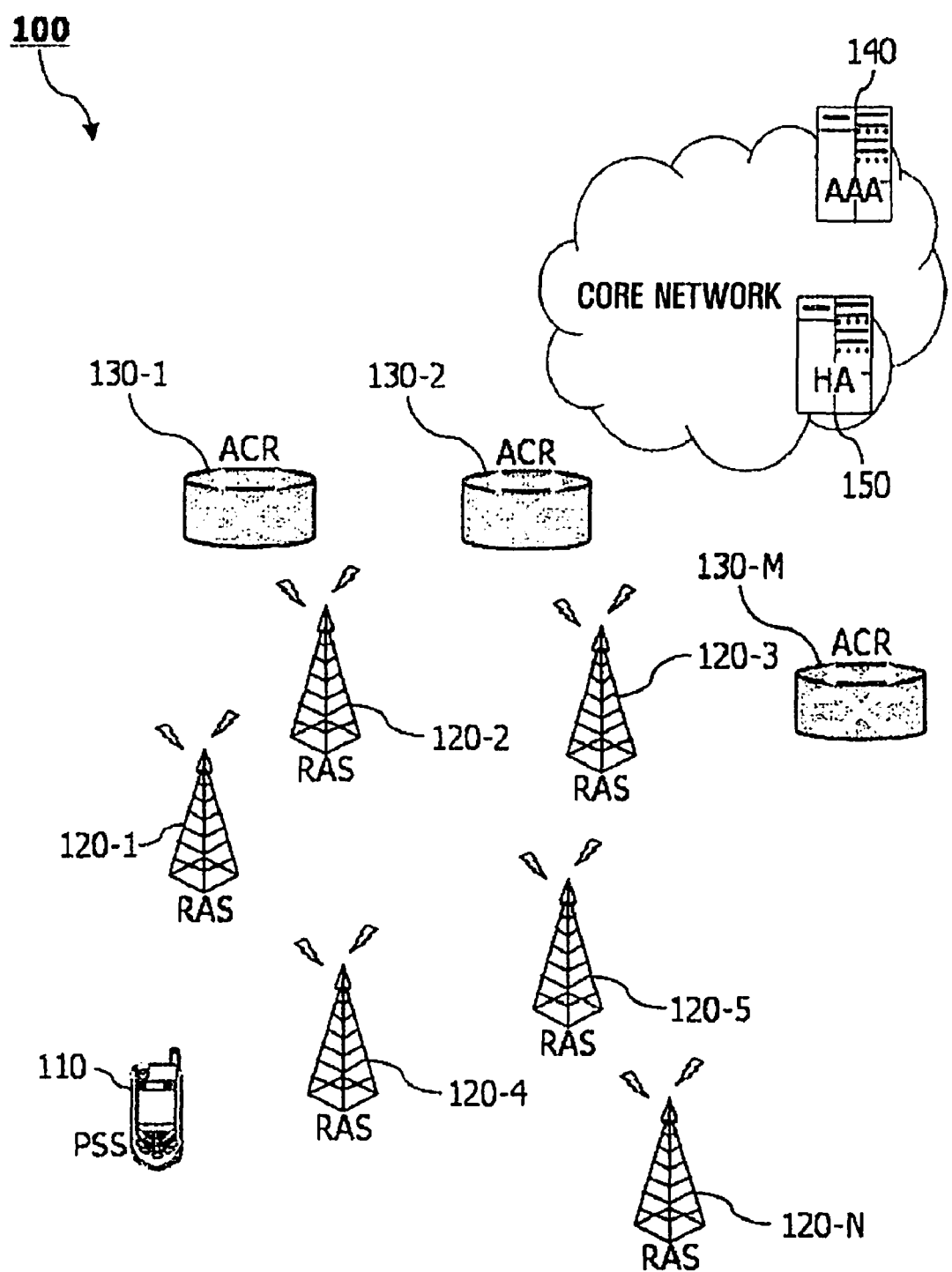
FIG. 1 is a schematic diagram of a WiBro communication system employing a connection control apparatus and method according to an exemplary embodiment of the present invention.

FIG. 1 is a schematic diagram of a WiBro communication system employing a connection control apparatus and method according to an exemplary embodiment of the present invention.

Referring to FIG. 1, the WiBro communication system 100 includes a Portable Subscriber Station (PSS) 110 which receives a mobile Internet service in a subscription area, a plurality of Radio Access Stations (RASs) 120-1 to 120-N for providing an Internet access service to the PSS 110 in their cells defined by a radio coverage, and a plurality of Access Control Routers (ACRs) 130-1 to 130-M for controlling the RASs 120-1 to 120-N.

The WiBro communication 100 may further include network elements such as an Authentication, Authorization and Accounting server (AAA) 140 and a Home Agent (HA) 150.

The PSS 110 synchronizes with one RAS 120-k (k=1, 2, ..., N) of the RASs 120-1 to 120-N for receiving the Internet service and receives downlink and uplink parameters from the RAS 120-k. The PSS 110 then transmits an initial RNG_REQ message to the RAS 120-k. Ranging is a process of adjusting transmission parameters for maintaining communication between the PSS 110 and the RAS 120-k. The synchronization means PHYsical layer (PHY) synchronization.

The PSS 110 starts a timer when the initial RNG_REQ message is sent to the RAS 120-k. The PSS 110 clears the timer if an RNG_RSP message is received before the timer expires. However, if an RNG_RSP message is not received before the time expires, the PSS 110 restarts the connection procedure.

Upon receiving the initial RNG_REQ message, the RAS 120-k forwards the RNG_REQ message to an ACR 130-i (i=1, 2, ..., M) of the ACRs 130-1 to 130-M. At this time, the RNG_REQ message is an Hbis initial RNG_REQ message. "Hbis" is an interface between an RAS and an ACR in the IEEE 802.16e standard.

Upon receiving the Hbis initial RNG_REQ message from the RAS 120-k, the ACR 130-i sends an Hbis initial RNG_RSP message to the RAS 120-k and its neighbor RASs. The neighbor RASs can be defined with a neighbor list of the RAS 120-k.

Among the RASs that have received the Hbis initial RNG_RSP message, one RAS 120-j (j=1, 2, ..., N) that has synchronized with the PSS 110 sends an initial RNG_RSP message to the PSS 110.

The RAS 120-k that has received the initial RNG_REQ message and the RAS 120-j that has transmitted the initial RNG_RSP message can be the same RAS (k=j) or different RASs (k≠j).

The neighbor RASs that are not synchronized with the PSS 110 discard the Hbis initial RNG_RSP message.

In some cases, the PSS 110, after transmitting a RNG_REQ message, may perform a handoff to another RAS before receiving a RNG_RSP message.

Figure 2:
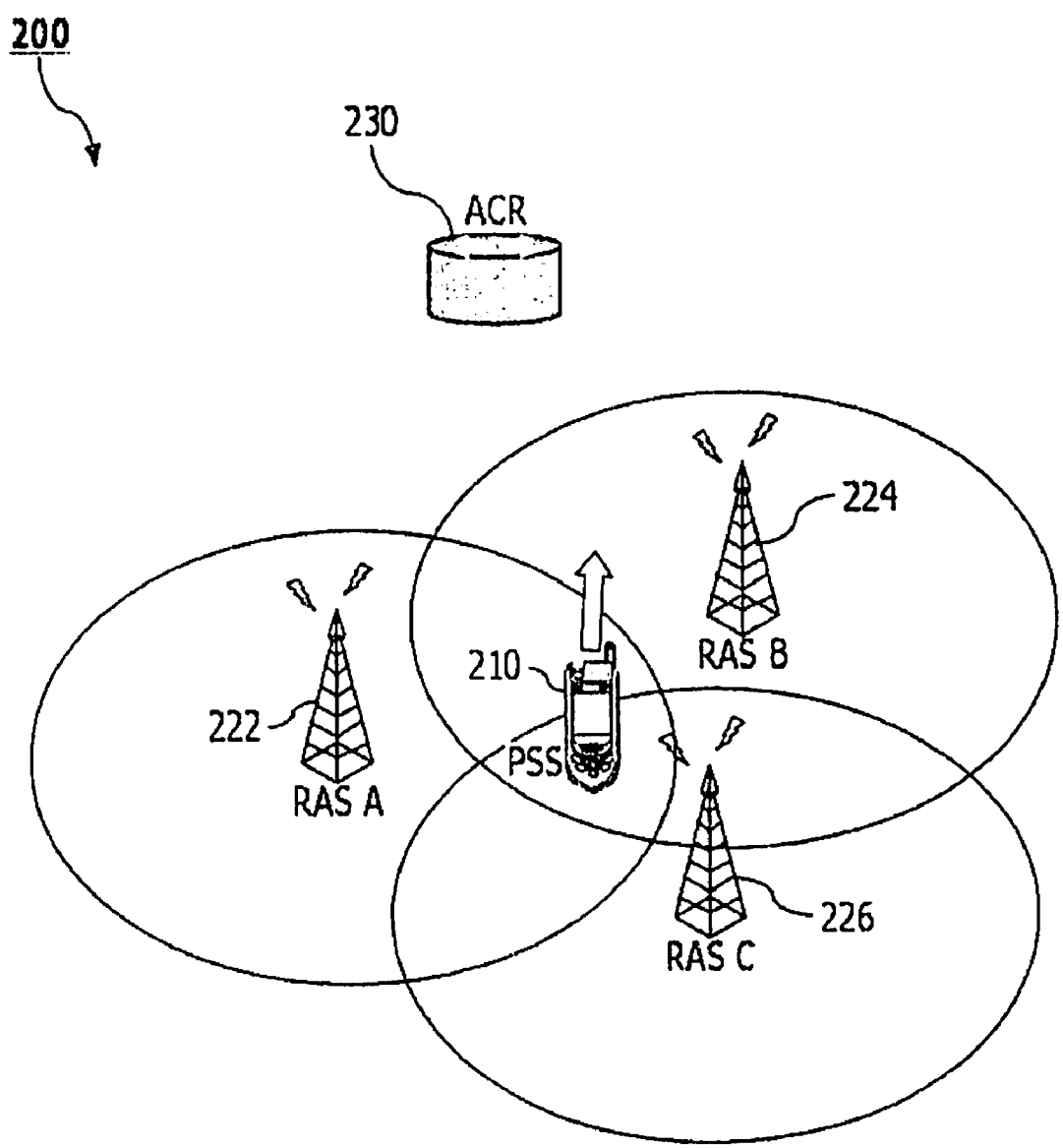
FIG. 2 is a diagram of a scenario where a Portable Subscriber Station (PSS) is located in a handoff area, for explaining a connection control system and method according to an exemplary embodiment of the present invention.

FIG. 2 is a diagram of a scenario where a PSS is located in a handoff area, for explaining a connection control system and method according to an exemplary embodiment of the present invention. In order to simplify the following explanation, RAS A 222 is referred to as "a serving RAS" and RAS B 224 is referred to as a "target RAS" below.

Referring to FIG. 2, the connection control system 200 includes three RASs 222, 224, and 226 of which cells are overlapped to form a is handoff area, a PSS 210 located in the handoff area, and an ACR connected to the RASs 222, 224, and 226 through Hbis interfaces. In this scenario, a PSS 210 located in the handoff area transmits an initial RNG_REQ message to the serving RAS 222 and attempts a handoff to the target RAS 224.

The PSS 210 synchronizes with the serving RAS 222 and acquires downlink and uplink parameters from the serving RAS 222. The PSS 210 then transmits an initial RNG_REQ message to the serving RAS 222 for performing a ranging process. The PSS 210 attempts a handover to the target RAS 224 after transmitting the initial RNG_REQ message.

Upon receiving the initial RNG_REQ message, the serving RAS 222 transmits the initial RNG_REQ message to the ACR 230 through an Hbis interface (the Hbis initial RNG_REQ message).

In response to the Hbis initial RNG_REQ message, the ACR 230 transmits an Hbis initial RNG_RSP message to the serving RAS 222 and its neighbor RASs. In this scenario, the RAS B 224 and RAS C 226 are included in the neighbor RASs. The neighbor RASs can be defined by a neighbor list of the serving RAS 222.

Among the neighbor RASs that have received the Hbis initial RNG_RSP message, the target RAS 224 that has synchronized with the PSS 210 during a handoff procedure transmits an initial RNG_RSP message to the PSS 210, and the other neighbor RASs including the RAS A 222 and RAS C 226 discard the Hbis initial RNG_RSP message.

Figure 3:
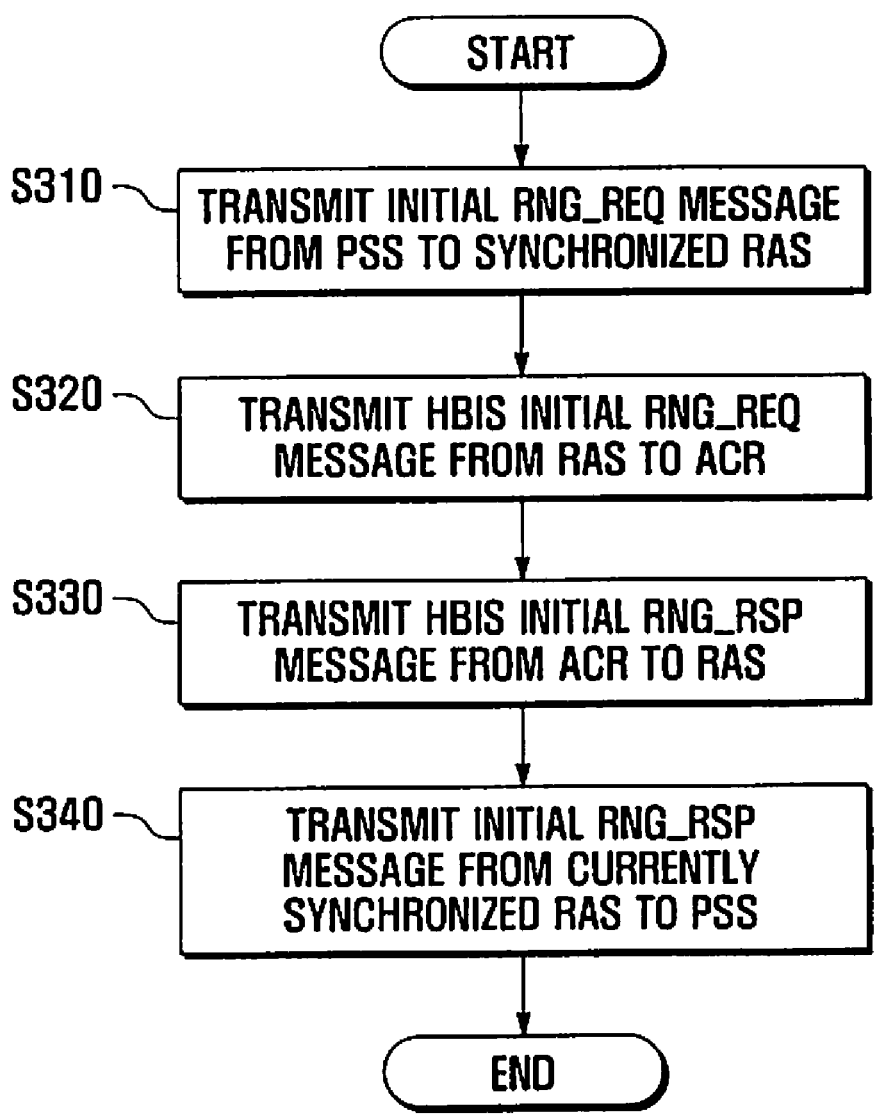
FIG. 3 is a flowchart of a connection control method according to an exemplary embodiment of the present invention.

FIG. 3 is a flowchart of a connection control method according to an exemplary embodiment of the present invention.

A connection control method according to an exemplary embodiment of the present invention includes relaying, at a radio access station, an initial ranging request message from the portable subscriber station to an access control router; transmitting, at the access control router received the initial ranging request message, an initial ranging response message to the radio access station and neighbor radio access stations; relaying, at a radio access station currently synchronized with the portable subscriber station and received the initial ranging response message, relaying the initial ranging response message to the portable subscriber station.

Referring to FIG. 3, after synchronizing with an RAS selected through a cell discovery process and acquires downlink and uplink parameter from the RAS, the PSS transmits an initial RNG_REQ message to the synchronized RAS, in step S310. The PSS starts a timer when the initial RNG_REQ message is transmitted and may perform a reconnection procedure if an initial RNG_RSP message is not received before the timer expires.

Upon receiving the initial RNG_REQ message, the RAS transmits an Hbis initial RNG_REQ message to an ACR, in step S320.

Upon receiving the Hbis initial RNG_REQ message, the ACR transmits an initial RNG_RSP message to the RAS transmitted the Hbis initial RNG_REQ message and its neighbor RASs in response to the Hbis initial RNG_REQ message, in step S330. As described above, the neighbor RASs are defined by the neighbor list of the RAS transmitted the Hbis initial RNG_REQ message.

Among the RASs received the Hbis initial RNG_RSP message, an RAS that has currently obtained synchronization with the PSS transmits an initial RNG_RSP message to the PSS, in step S340.

As described above, the RAS that has received the initial RNG_REQ message from the PSS and the RAS that has transmitted the initial RNG_RSP to the PSS are the same RAS. In this case, the PSS maintains the synchronization with the RAS received the initial RNG_REQ message.

In contrast, the RAS that has received the initial RNG_REQ message from the PSS and the RAS that has transmitted the initial RNG_RSP to the PSS are different from each other. In this case, the PSS performs a handoff to the RAS transmitted the initial RNG_RSP message after it transmits the initial RNG_REQ message.

The connection control procedure, when the RAS that has received the initial RNG_REQ message from the PSS and the RAS that has transmitted the initial RNG_RSP message to the PSS are different, is described in more detail with reference to FIG. 4.

Figure 4:
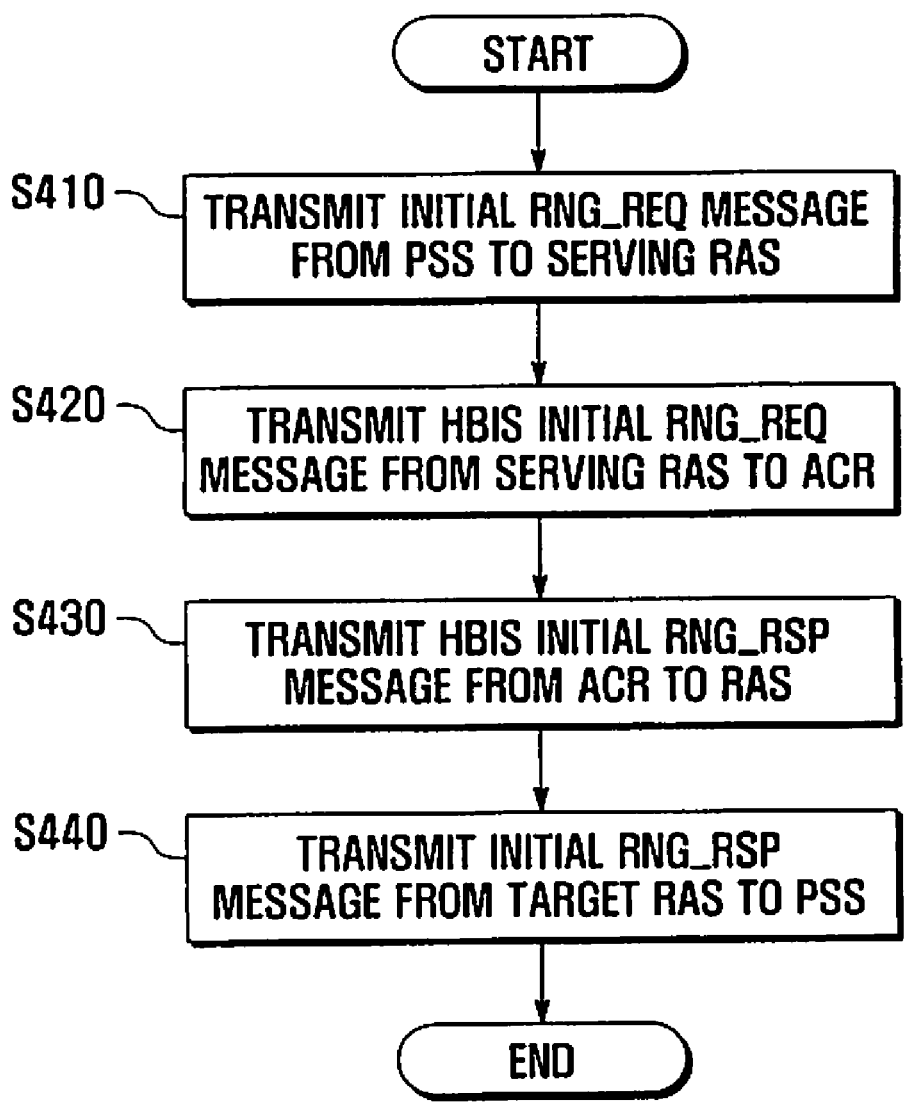
FIG. 4 is a flowchart of a connection control method according to another exemplary embodiment of the present invention. In this embodiment, it is assumed that the PSS is located in a handoff area.

FIG. 4 is a flowchart of a connection control method according to another exemplary embodiment of the present invention. In this embodiment, it is assumed that the PSS is located in a handoff area.

A connection control method according to the exemplary embodiment of the present invention illustrated in FIG. 4 includes transmitting, at the portable subscriber station, an initial ranging request message to a serving radio access station; transmitting, at the serving radio access station, an Hbis initial ranging request message to an access control router in response to the initial ranging request message; transmitting, at the access control router, an Hbis initial ranging response message to the serving radio access station and neighbor radio access stations in response to the Hbis initial ranging request message; and transmitting, at a target access control router among the neighbor radio access stations that have received the Hbis initial ranging response message, an initial ranging response message to the portable subscriber station.

Referring to FIG. 4, a PSS transmits an initial RNG_REQ message to a serving RAS that has synchronized with the PSS, in step S410.

Upon receiving the initial RNG_REQ message, the serving RAS transmits an Hbis initial RNG_REQ message to an ACR through an Hbis interface, in step S420.

Upon receiving the Hbis initial RNG_REQ message, the ACR transmits an Hbis initial RNG_RSP message to the serving RAS and its neighbor RASs, in response to the Hbis initial RNG_REQ message, in step S430. Among the RASs that have received the Hbis initial RNG_RSP message, an RAS currently synchronized with the PSS through a handoff process, i.e. a handoff target RAS, transmits an initial RNG_RSP message to the PSS, in step S440. The neighbor RASs including the target RAS are defined by a neighbor list of the serving RAS.

The PSS starts a timer when the initial RNG_REQ message is transmitted, and performs a reconnection procedure if the initial RNG_RSP message is not received before the timer expires. The connection control method may further include a handoff process between a serving RAS and a target RAS in the handoff area. The change of an RAS synchronized with the PSS occurs when the PSS is located in a handoff area or the PSS moves fast from one cell to another.

As described above, the connection control system and method for a mobile communication system according to the present invention allow an ACR to transmit an Hbis initial RNG_RSP message to a RAS that has received an initial RNG_REQ message from a PSS and its neighbor RASs, thereby improving connection reliability even when the an RAS synchronized with the PSS has changed by a fast movement of the PSS or a handoff to another RAS.

Also, the connection control system and method for a mobile communication system according to the present invention enable a PSS to receive an initial RNG_RSP message, even when the PSS has performed a handoff to another RAS, from a handoff target RAS which synchronizes with the PSS during the handoff process, resulting in a reduction of connection delays.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A connection control method for a mobile communication system including at least one radio access station for providing a communication service to a portable subscriber station, and at least one access control router for controlling the radio access station, comprising:

relaying, at a radio access station, an initial ranging request message from the portable subscriber station to an access control router;

transmitting, at the access control router that has received the initial ranging request message, an initial ranging response message to the radio access station and neighbor radio access stations;

relaying, at a radio access station that is currently synchronized with the portable subscriber station and that has received the initial ranging response message, the initial ranging response message to the portable subscriber station; and performing a handoff of the portable subscriber station from the radio access station that has relayed the initial ranging request message to the radio access station that has relayed the initial ranging response message, after the radio access station relays the initial ranging request message, wherein the radio access station that has relayed the initial ranging request message and the radio access station that has relayed the initial ranging response message are different radio access stations.

2. The connection control method of claim 1, wherein the neighbor radio access stations are listed in a neighbor list of the radio access station that has relayed the initial ranging request message to the access control router.

3. The connection control method of claim 1, wherein the radio access station that has relayed the initial ranging request message and the radio access station that has relayed the initial ranging response message are the same radio access station.

4. The connection control method of claim 1, further comprising:
when the initial ranging request message is transmitted, starting a timer at the portable subscriber station; and
if the initial ranging response is not received before the timer expires, performing a reconnection process.

5. A connection control method for a mobile communication system including at least one radio access station for providing a communication service to a portable subscriber station, and at least one access control router for controlling the radio access station, comprising:
transmitting, at the portable subscriber station, an initial ranging request message to a serving radio access station;
transmitting, at the serving radio access station, an Hbis initial ranging request message to an access control router in response to the initial ranging request message;
transmitting, at the access control router, an Hbis initial ranging response message to the serving radio access station and neighbor radio access stations in response to the Hbis initial ranging request message;
transmitting, at a target access control router among the neighbor radio access stations that have received the Hbis initial ranging response message, an initial ranging response message to the portable subscriber station; and
performing a handoff of the portable subscriber station from the serving radio access station to the target radio access station after transmitting the initial ranging request message.

6. The connection control method of claim 5, wherein the neighbor radio access stations include the target radio access station and are defined by a neighbor list managed by the serving radio access station.

7. The connection control method of claim 5, further comprising:
when the initial ranging request message in transmitted, starting a timer, at the portable subscriber station; and
if the initial ranging response is not received before the timer expires, performing a reconnection process.

8. A connection control system for a mobile communication network including at least one radio access station for providing a communication service to a portable subscriber station, and at least one access control router for controlling the radio access station, wherein, the portable subscriber station relays an initial ranging request message from the portable subscriber station to an access control router;

the access control router that has received the initial ranging request message transmits an initial ranging response message to the radio access station and neighbor radio access stations; and a radio access station that is currently synchronized with the portable subscriber station and that has received the initial ranging response message relays the initial ranging response message to the portable subscriber station, wherein the neighbor radio access stations. except for the radio access station currently synchronized with the portable subscriber station, discard the initial ranging response message received from the access control router.

9. The connection control system of claim 8, wherein the portable subscriber station starts a timer when the initial ranging request message is transmitted.

10. The connection control system of claim 9, wherein if the initial ranging response message is received before the timer expires, the portable subscriber station clears the timer.

11. The connection control system of claim 9, wherein if the initial ranging response message is not received before the timer expires, the portable subscriber station performs a reconnection process.

12. The connection control system of claim 8, wherein the radio access station that has relayed the initial ranging request message and the radio access station that has relayed the initial ranging response message are the same radio access station.

13. The connection control system of claim 8, wherein the radio access station that has relayed the initial ranging request message and the radio access station that has relayed the initial ranging response message are different radio access stations.

14. The connection control system of claim 13, wherein the portable subscriber station performs handover from the radio access station that has relayed the initial ranging request message to the radio access station that has relayed the initial ranging response message, after the radio access station relays the initial ranging request message.

15. A connection control system for a mobile communication network, comprising:
a portable subscriber station which transmits an initial ranging request message and performs a handoff;
a serving radio access station which receives the initial ranging request message and transmits an Hbis initial ranging request message;
an access control router which receives the Hbis initial ranging request and transmits an Hbis initial ranging response to the serving radio access station and neighbor radio access stations of the serving radio access station;
a target radio access station which receives the Hbis initial ranging response message and transmits an initial ranging response message to the portable subscriber station in response to the Hbis initial ranging response message; and
performing a handoff of the portable subscriber station from the serving radio access station to the target radio access station after transmitting the initial ranging request message.

16. The connection control system of claim 15, wherein the neighbor radio access stations are defined in a neighbor list managed by the serving radio access station.

* * * * *